Feb. 25, 1941.     R. D. SMITH     2,233,371
WHEEL MACHINE
Filed April 9, 1938     3 Sheets-Sheet 1

Roy D. Smith   Inventor

By Merrill M. Blackburn.
Attorney

Roy D. Smith Inventor

By Merrill M. Blackburn
Attorney

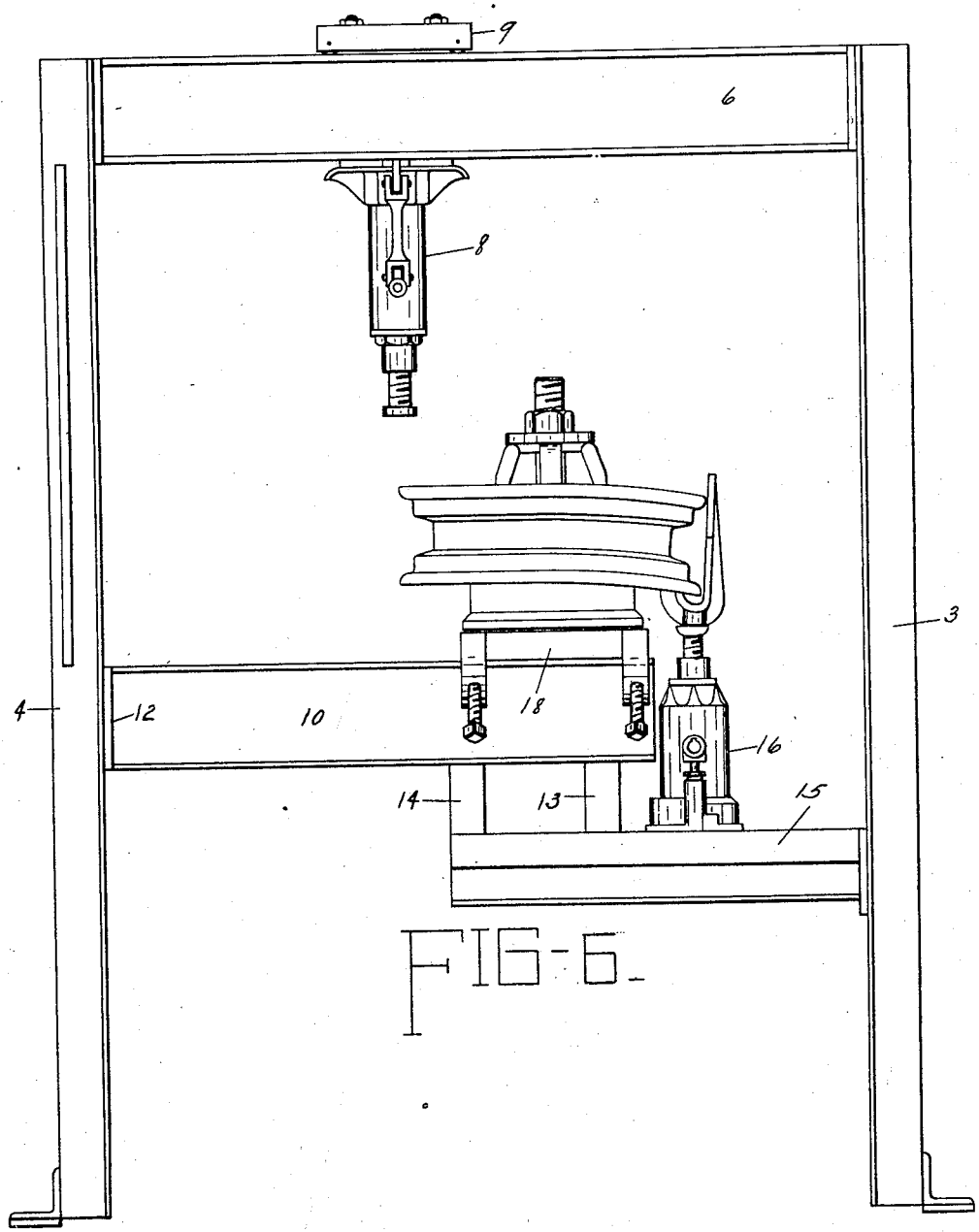

Patented Feb. 25, 1941

2,233,371

UNITED STATES PATENT OFFICE 2,233,371

WHEEL MACHINE

Roy D. Smith, Davenport, Iowa, assignor to Bee Line Manufacturing Company, Scott County, Iowa, a corporation of Iowa Application April 9, 1938, Serial No. 201,136

4 Claims. (Cl. 144—288)

The present invention pertains to mechanism for operating upon vehicle wheels, more particularly the wheels of automobiles and trucks, to correct errors of form, such as are the result of accidents. Among the objects of this invention are to provide a convenient mechanism for the purpose indicated; to provide a mechanism for the purpose indicated which may be operated in various ways to remove the numerous bends, twists, and kinks which are found in automobile wheels as a result of strains or accidents; to provide an apparatus of the type indicated which is as near universal in its application as can be produced; to provide an apparatus which is equipped with the necessary tools for correcting all of the malformations which may find their way into vehicle wheels because of excessive strains due to one reason or another; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 6 represents the apparatus of Fig. 1 set up for a different operation than any shown in any of the preceding figures.

Figure 1:
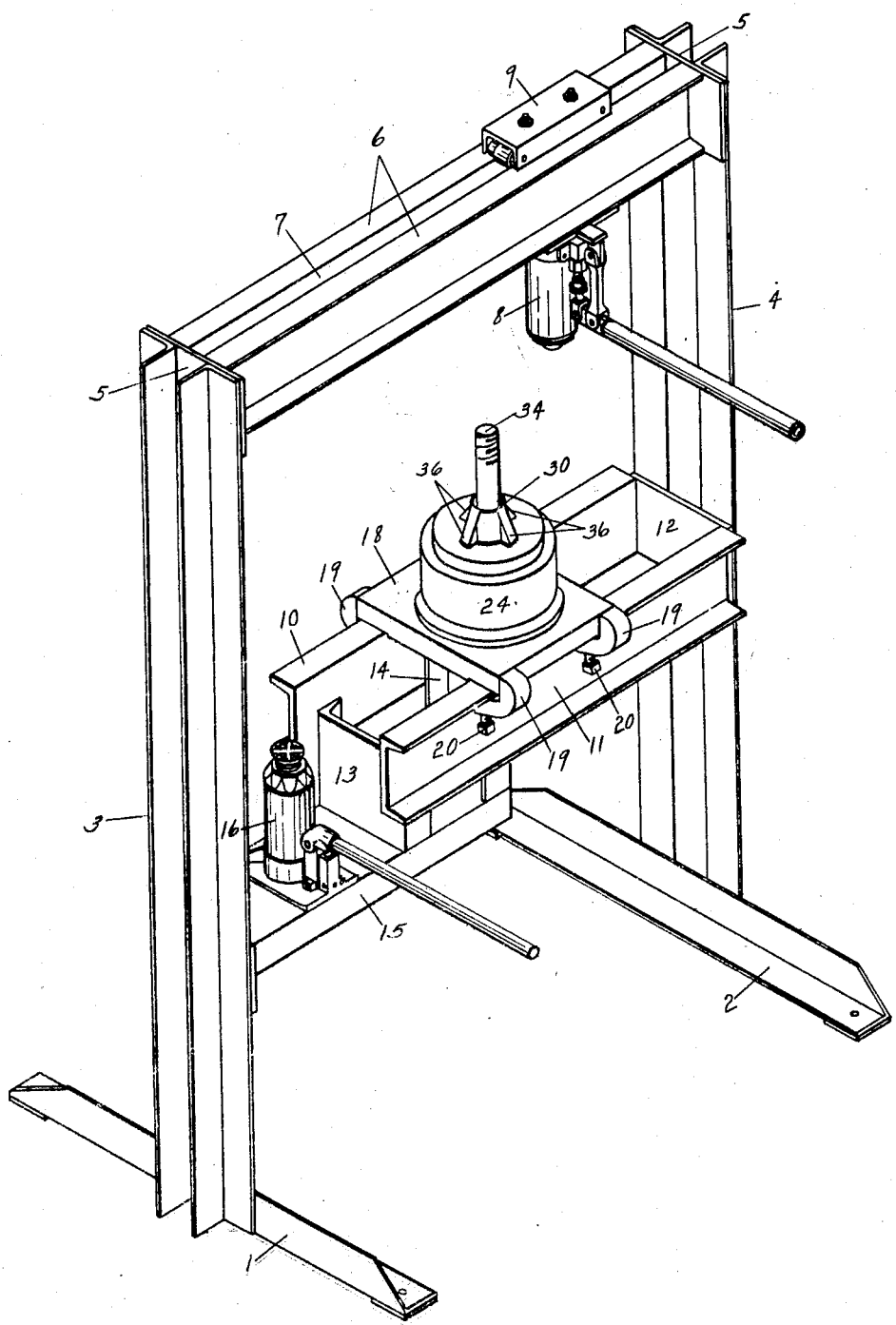
Fig. 1 represents a perspective of the major portion of my invention, ready to receive a wheel which is to be operated upon.

Reference will now be made in greater detail to the annexed drawings for a more complete description of this invention. A pair of base members 1 and 2 are constructed from suitable material, shown in the present instance as structural shapes, such as angles, and secured to these elements 1 and 2 are uprights 3 and 4, also shown as made from angles. These parts are secured together in any suitable way, as by welding, preferably electric or acetylene. Plates 5 connect these angles in pairs, at the top, and then the plates are connected by channels 6, preferably by some type of welding. The channels 6 are preferably placed with their flat sides toward each other and spaced apart somewhat so that a suspending means for a jack may extend through the slot 7 between the channels. To the lower end of the suspending means is secured a jack 8 of suitable construction, the jack being so positioned with relation to the channels that there is very little space between its base and the edges of the channels. Movement of the jack longitudinally of the channels is therefore permitted so that the jack may be placed anywhere desired for any particular operation to be performed upon a wheel. A carrier 9 for the jack is arranged to ride along the top of the channels 6. These channels connecting the uprights 3 and 4 at their upper end portions are referred to herein, collectively, as a cross bar.

Below the cross bar, described above, is a cross member made up of different parts secured together by welding and, likewise, secured by welding to the uprights 3 and 4. One section of this cross member comprises the channels 10 and 11 which are fastened at one end to a plate 12, which latter is secured to the uprights 4. The opposite ends of the channels 10 and 11 are connected by means of a connector 13 to which the parts 10 and 11 are preferably welded. A second member 14, similar to the member 13, connects the channels 10 and 11 and to these members 13 and 14 is secured a second sections 15 of the cross member. The second end of this member 15 is secured to the uprights 3 in a manner comparable to the connection of the channels 10 and 11 to the uprights 4. This second element 15 of the cross member is secured to the members 13 and 14 so as to constitute a rigid connection between the uprights 3 and 4. Also, the upper or supporting surface of the section 15 is, as clearly shown, at a lower elevation than the top of the section first described. On this section 15 is mounted a jack 16 which is utilized, as illustrated in Fig. 6, in operating upon a vehicle wheel to straighten the rim.

A table 18 rests on top of the channels 10 and 11 and is readily slidable lengthwise thereof. This table is provided with arms 19 which engage under the upper flanges of the channels 10 and 11 and have screws 20 extending therethrough which may be tightened up to hold the table 18 in place. A hollow spindle 21 extends through the plate 18 and is screw-threaded at its lower end to receive a nut 22. A cotterpin 23 is applied after the nut 22 is secured in place and this holds the nut against rotation with relation to the spindle. While I have referred herein to the use of angles and channels in the fabrication of the framework of this structure, it is to be understood that this frame may be made from other materials. Also, the parts may be secured together otherwise than by welding, if desired.

The spindle 21 is provided intermediate its ends with a shoulder which engages the under side of the base of the drum 24, being screwed into the drum tightly. The spindle is thus held against longitudinal movement in the drum. However, it may move freely through the table 18, the nut 22 not being tightened up enough to draw the drum against the table. The shoulder results from the formation of a flange 21a about the periphery of the spindle.

A depression is formed in the upper face of the table 18 for the reception of the flange 21a and a ring 25, which latter has a groove formed in its upper surface for the reception of balls 26 constituting part of a ball bearing. Pins 27 extend through openings in the table 18 and are surrounded by coiled springs 28 located in sockets in the table. These springs 28 lift the ring 25 and, through the balls 26, lift the drum 24 away from the table 18. This reduces the friction between the table and the drum so as to permit easy rotation of the latter with relation to the former. The nuts 27a on the pins 27 are to be tightened up until the springs 28 are compressed to a point such that the edge of the drum 24 just clears the table 18. When this apparatus is being used, the springs yield under downward pressure of the drum 24 and permit the drum to rest upon the table 18, the ring 25 being still clear of the bottom of the depression in the table. Therefore, excessive pressure upon the balls 26 and the ring 25 is avoided and it is therefore not necessary to have a hardened ring for the ball race.

Figure 2:
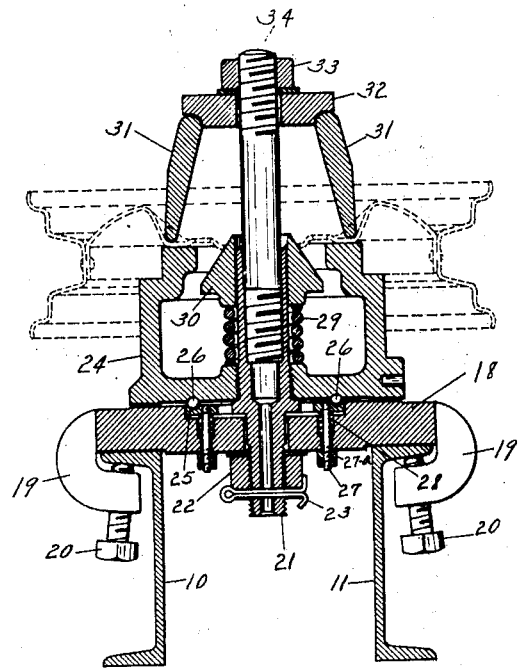
Fig. 2 represents a transverse section of the apparatus shown in Fig. 1 with a wheel shown in position therein, in dotted lines, and ready to be operated upon.
Figure 3:
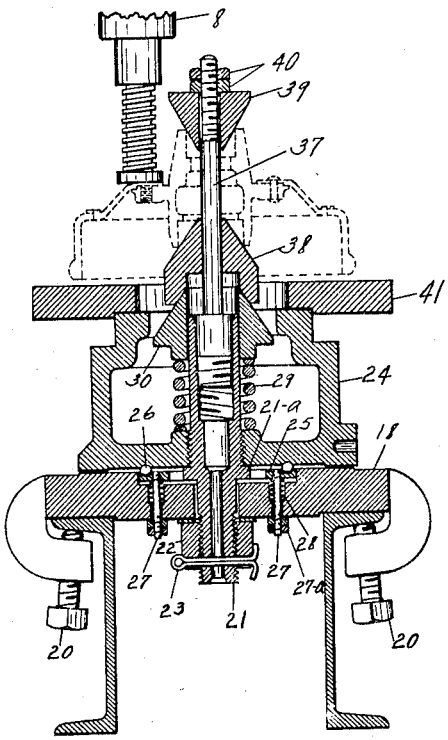
Fig. 3 is a similar view with a hub and brake drum in position to be operated upon.
Figure 4:
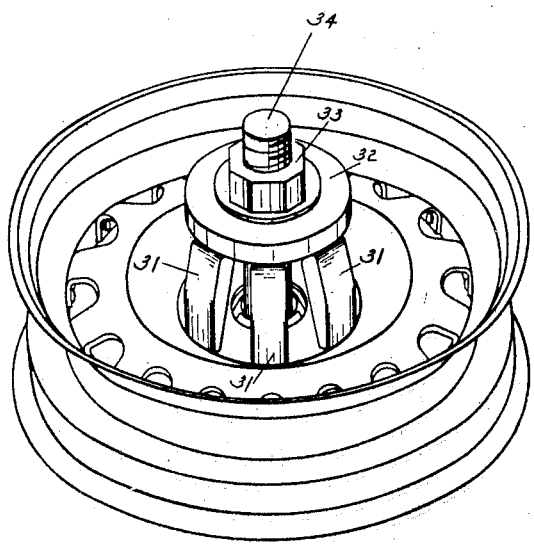
Fig. 4 represents a perspective view of a wheel and a portion of the apparatus, the same being intended to amplify the disclosure of Fig. 2.
Figure 5:
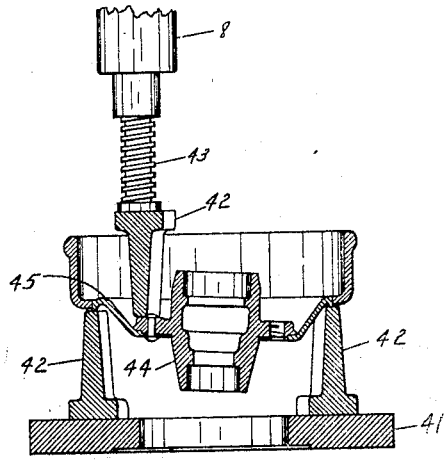
Fig. 5 represents, in vertical section, a portion of this apparatus with a hub and brake drum mounted thereon in a different position from that shown in Fig. 3 and illustrating a different operation upon the hub and brake drum assembly.

A coiled spring 29 surrounds the upper portion of the spindle 21 and rests at its lower end upon the upper face of the lower end of the drum 24. Upon the upper end of the spring 29 rests a cone 30 which has an axial opening for the reception of the upper end of the spindle 21. As shown in Fig. 2, the inner edge of the wheel disc rests upon the conical face of member 30 and the disc is therefore centered by the member 30. This member is readily slidable upon the spindle and may be pushed downwardly by pressing downward upon the wheel. Blocks 31 are put in between the wheel disc and the ring 32 and then the nut 33 is turned down until the disc is held tightly against the upper end of the drum 24. The nut 33 has screw-threaded connection with the extension 34 which is screwed into the spindle 21. When the nut 33 is screwed down tightly, the wheel is held rigidly to the table and may be operated on, either from above by means of the jack 8 or from below by means of the jack 16. The latter operation is shown in Fig. 6. This figure shows the right hand edge portion of the wheel bent downwardly and the jack 16 arranged to bend this back into desired form. Figs. 3 and 5 represent the use of the jack 8 in working upon the hub flange and the brake drum, respectively.

As is obvious from Fig. 1, the element 30, which has been referred to as conical in form, is not strictly conical but comprises a sleeve, substantially cylindrical in form, and a plurality of wedge-shaped elements 36 which give to this element a somewhat conical shape so that it serves to properly position the wheel with respect to the drum.

When the hub disc is bent, this can be straightened, as indicated in Fig. 3, by substituting an extension 37 for the extension 34 and placing a conical member 38 thereon, as illustrated clearly in Fig. 3. The hub is then mounted on this assembly and the cone 39 and nuts 40 are added. Now, when the jack 8 is put into position, as shown, and extended, the brake drum is forced into engagement with the plate 41 which was mounted on the drum 24 before the brake drum was put into position. Now, when the jack is extended still farther, the hub disc, which is ordinarily bent in the region of the edge of the hub flange, is pressed downwardly so as to remove the bend. When the disc has been satisfactorily re-shaped and the drum tested by being rotated about the extension 37 to see whether it is uniformly distant at all points from the plate 41, then the nut 40 and the cone 39 may be removed and the hub and drum put back in place.

Fig. 5 illustrates the use of this apparatus in straightening a bent spot in the brake drum disc. In this operation, the parts 37 to 40, inclusive, may be omitted and the drum mounted on supporting posts 42 which are stood up on the plate 41. The jack 8 is now moved over the brake drum, as indicated, and a post 42 is inverted and inserted between the ram 43 of the jack 8 and the flange of the hub 44. Now, when the jack is extended, the bent indicated at 45 will be removed from the brake disc and the parts will be returned to normal position.

It will of course be understood that the specific description of structure set forth above may be departed from without departing from the spirit of this invention as set forth in this specification, provided the departure comes within the scope of the claims.

Having now described my invention, I claim:

1. A wheel-holding mechanism for a wheel machine comprising an approximately flat table, a drum rotatably mounted thereon, a spindle connected to the table and extending through the drum, means for holding the spindle attached to the table, a coiled spring surrounding said spindle and supported by the bottom of the drum, and holding means for positioning and holding a wheel to be operated upon, the last named means comprising a roughly conical member cooperating with the spindle and spring and adapted to be forced upwardly into the central aperture of a held wheel member and into engagement with the internal edge of said wheel member.

2. A wheel-holding mechanism for a wheel machine, comprising a supporting table, a spindle rigidly supported thereby, a drum secured to the spindle with the spindle extending through the interior of the drum, a conical positioning member within a face opening of the drum, the tapered face of said conical member being directed upwardly, and a spring surrounding said spindle and bearing at one end against an inner face of the drum and at its other end against the conical member which transmits force from the spring to a wheel member supported on said machine.

3. In an apparatus for working upon wheel elements, the combination of a supporting frame, a table carried thereby and having clamping means for clamping it to the frame, a spindle secured to the table and rising therefrom, a drum secured to the spindle and having its upper surface substantially perpendicular to the axis of the spindle, said drum being relatively rotatable with respect to said table about the axis of the spindle, said frame having a cross-member below its top to which said table may be clamped, a roughly conical member surrounding the spindle and adapted to slide upwardly thereon, and a spring inside of the drum, surrounding the spindle and pressing upwardly against said roughly conical member to lift the upper end thereof above the drum.

4. A structure as defined by claim 3 in which the spindle is provided with an upwardly extending extension member upon which is slidably mounted an adjustable abutment member, said structure having blocks located between the abutment member and the disc of a wheel mounted on the drum to engage the conventional depressions in the wheel disc, and adjustable means for forcing the blocks to press a wheel disc against an end of the drum.

ROY D. SMITH.